United States Patent [19]
Gee

[11] Patent Number: 5,348,333
[45] Date of Patent: Sep. 20, 1994

[54] PORTABLE TONGUE FOR TRAILERS

[75] Inventor: Calvin J. Gee, Somerville, Ala.

[73] Assignee: GMT, Inc., Boaz, Ala.

[21] Appl. No.: 5,789

[22] Filed: Jan. 19, 1993

[51] Int. Cl.$^5$ .............................................. B60D 1/52
[52] U.S. Cl. ........................... 280/491.5; 280/491.1; 280/495
[58] Field of Search .................. 280/491.1, 491.5, 482, 280/460.1, 416.3, 416.2, 416.1, 415.1, 414.5, 400, 414.1, 401, 474, 476.1, 495

[56] References Cited

U.S. PATENT DOCUMENTS

| | | | |
|---|---|---|---|
| 2,976,060 | 3/1961 | Barden | 280/491.5 |
| 3,501,169 | 3/1970 | Nutt | 280/491.5 |
| 3,873,130 | 3/1975 | Whitley | 280/414.1 |
| 4,204,701 | 5/1980 | Oltrogge | 280/491.5 |
| 4,269,428 | 5/1981 | Rexine | 280/491.1 |
| 4,930,799 | 6/1990 | Pihlstrom et al. | 280/400 |
| 5,149,122 | 9/1992 | Helber | 280/491.1 |

*Primary Examiner*—Margaret A. Focarino
*Assistant Examiner*—Anne Marie Boehler
*Attorney, Agent, or Firm*—John C. Garvin, Jr.

[57] ABSTRACT

A portable (removable) tongue for connecting a house trailer to a towing vehicle for towing the trailer from one location to another with the tongue being adapted for easy and rapid disconnection from the towing vehicle and trailer. The tongue is adapted to be attached to, and removed from, the frame which supports a house trailer and includes a coupler and hitch lock, a pair of arms connected to and diverging from the coupler and hitch lock, a pair of male coupling members secured to the free ends of each arm, and a pair of female coupling members adapted to be secured to the frame of the trailer, and a clip for locking each male coupling member to a respective female coupling member. The tongue is adapted to be readily secured to the frame of the trailer for towing purposes and easily removed from the frame of the trailer while the trailer is parked in a trailer court for living purposes.

4 Claims, 1 Drawing Sheet

PORTABLE TONGUE FOR TRAILERS

FIELD OF THE INVENTION

This invention relates to removable means for vehicular towing, and more particularly to a portable tongue for connecting a house trailer to a towing vehicle for towing the house trailer from one location to another with the tongue being adapted for easy and rapid disconnection from the towing vehicle and the house trailer.

BACKGROUND OF THE INVENTION

Conventional house trailers have, for many years, included a generally triangular-shaped tongue permanently secured to one of the narrow sides (front) of the trailer and protruding three to four feet from the trailer, while the trailer is being towed, while the trailer is temporarily located on a sales lot, and when the trailer is in a trailer park and being used as a home. The conventional tongue, being permanently secured to the trailer, not only takes up substantial space, but also presents a safety hazard which can be easily tripped over by a person walking through the area or by children playing in the area.

While there are numerous hitch assemblies in the prior art, those disclosed and claimed in U.S. Pat. Nos. 3,716,255 and 3,759,547 are the most relevant to the, subject matter of the invention disclosed herein.

The portable tongue shown in U.S. Pat. No. 3,716,255 is adapted to be removably secured to an elongated channel beam fixed to a trailer with the channel beam having a centrally located opening therein and a web projecting from its lower edge. The tongue includes a pair of diverging arms fixed to an elongated, generally flat, hitching beam having a centrally located opening therein adapted for alignment with the opening in the channel beam of the trailer and a hook on its lower edge adapted for wrapping partially around and engaging the web projecting from the channel beam of the trailer. A bolt is inserted through the aligned openings in the channel beam of the trailer and the hitching beam of the tongue for securing the tongue to the trailer by applying a nut upon the bolt.

The portable tongue shown in U.S. Pat. No. 3,759,547 is adapted to be removably secured to a complex beam structure fixed to the load bearing understructure of a trailer. The complex beam structure includes a pair of connection plates with each plate having a plurality of openings therein. The tongue includes a pair of diverging arms, each having a connection plate with a plurality of openings therein and adapted for alignment with the openings in a respective connection plate fixed to the complex beam structure of the load bearing understructure of the trailer. The tongue is secured to the trailer by aligning the openings in the two pairs of connection plates, inserting a bolt vertically through the aligned openings and applying a nut to each bolt.

The prior art portable tongues for trailers, including those discussed above, have not been readily accepted by industry and presented problems and disadvantages particularly when compared to the simple, inexpensive, portable tongue of the present invention. The conventional tongues which are permanently fixed to the trailer, not only add costs to the trailer and take up substantial space while the trailer is temporarily parked in either a sales lot or more permanently parked in a trailer park, they also present a major safety hazard to people walking or playing around the trailer when so parked. There is, therefore, a need for a rugged, durable, and inexpensive removable (portable) tongue for trailers which overcome the problems and disadvantages of the prior art and conventional tongues for trailers. The portable (removable) tongue of the present invention fulfills these needs.

Accordingly, it is an object of the present invention to provide a simple, inexpensive, and portable tongue for connecting a house trailer to a towing vehicle for towing the house trailer from one location to another with the tongue being adapted for easy disconnection from both the towing vehicle and house trailer.

A further object of the present invention is to provide a portable tongue for use with the frame of a trailer which can be readily and easily detached from the frame of the trailer by the removal of a limited number of securing members without the need for special tools or mechanical skills.

These objects as well as other objects and advantages of the present invention will become more readily apparent from the following description taken in conjunction with the accompanying drawings.

DETAILED DESCRIPTION OF THE INVENTION

Figure 1:
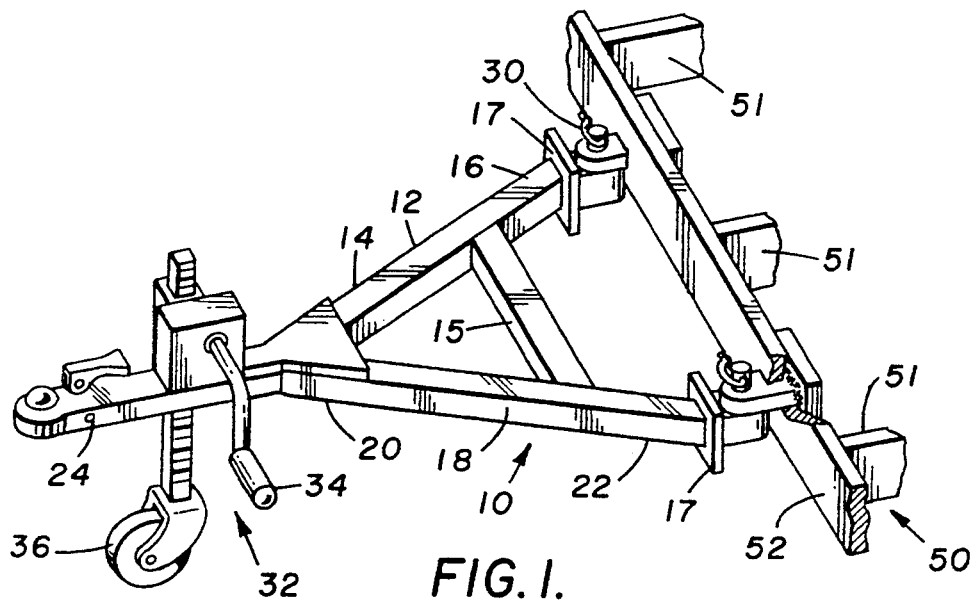
FIG. 1 is a partially broken away, perspective, view of the preferred embodiment of the portable tongue of the present invention removably secured to a frame, such as may be used for a house trailer.
Figure 2:
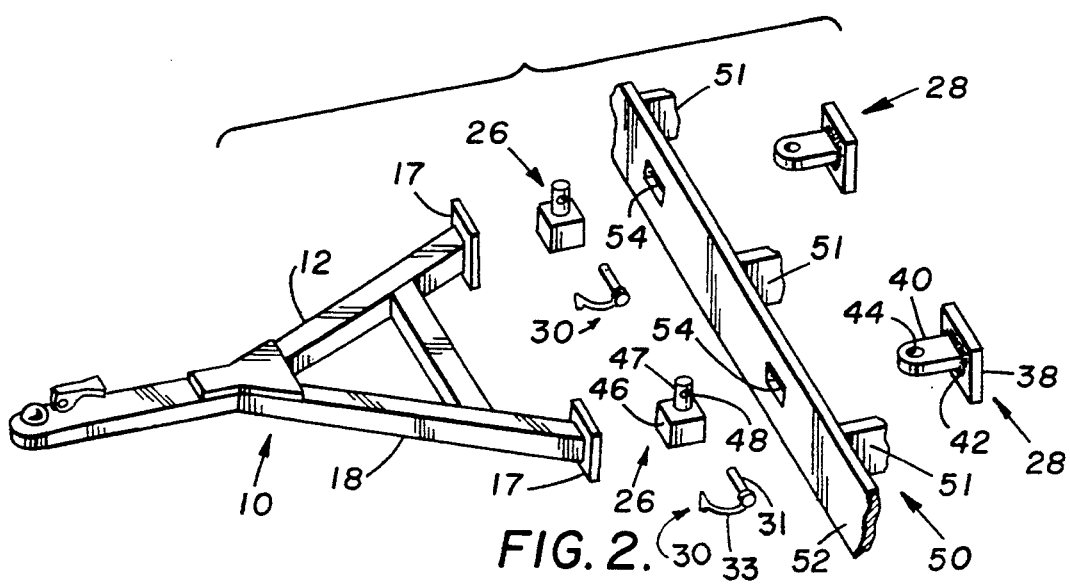
FIG. 2 is an exploded view of the portable tongue of FIG. 1 separated from a frame.

FIG. 1 illustrates, by way of example, a first embodiment of a portable (removable or detachable) tongue 10 removably secured to the most forward transverse cross member 52 of frame 50 which supports a house trailer or the like (not shown). Support flame 50 also includes a plurality of longitudinally extending support members 51 which are integrated or secured to cross members 52 by any conventional means such as welds (not shown). As shown, the most forward cross member 52 of frame 50 has a pair of openings 54 (FIG. 2) therethrough for receiving female coupling members 28 permanently secured to the most forward cross member 52 by any conventional means such as bolts or welds (not shown). As best illustrated, by way of example, in FIGS. 1 and 2, the portable (removable) tongue 10 comprises a first arm 12 having a first end portion 14 and a second end portion 16, a second arm 18 having a first end portion 20 and a second end portion 22, a rod 15 secured to and connecting first arm 12 and second arm 18 for bracing and strengthening tongue 10, a conventional trailer coupler and hitch lock 24 secured to the first end portion 14 of first arm 12 and first end portion 20 of second arm 18, a plate 17 fixed to second end portion 16 of first arm 12 by any conventional means such as welds (not shown), a plate 17 fixed to second end portion 22 of second arm 18 by any conventional means such as welds (not shown), a male coupling member 26 secured to each of the plates 17 fixed to second end portions 16 and 22 of first arm 12 and second arm 18 by any conventional means such as welds or nuts and bolts (not shown), a pair of female coupling members 28, a pair of locking clips 30, and a conventional crank jack 32 (FIG. 1) including a crank handle 34 and a wheel 36. Each of the female coupling members 28 has a generally rectangular base plate 38 adapted to be fixed to the back or inside surface of the most forward cross member 52 of frame 50 by any conventional means such as welds or bolts (not shown), a projection 40 extending from and secured to the base plate 38 by any conventional means such as welds 42 (FIG. 2), and a round opening 44. Each of the male coupling members 26 includes an enlarged base 46 fixed to the plates 17 on the second end portions 16 and 22 respectively of first arm 12 and second arm 18 by any suitable means such as welds or bolts (not shown), a round bar 47 extending from and secured to the top side of enlarged base 46 by being made integrally therewith or by any suitable means such as welds, and a transverse bore 48 in the upper end of round bar 47. The tongue 10 is removably secured to the most forward cross member 52 of frame 50 by inserting each of the round bars 47 of bases 46 affixed to the plates 17 on second end portions 16 and 22 respectively of first arm 12 and second arm 18 upwardly into round openings 44 of female coupling members 28 until the transverse bore 48 of each round bar 47 is fully exposed above the upper surface of each of the projections 40 of female coupling members 28 and a locking clip 30 is inserted through each transverse bore 48 and secured to lock each round bar 47 of male coupling members 26 to a respective female coupling member 28. Locking clip 30 may be any conventional clip or even a simple nut and bolt. As shown, each clip 30 comprises a round bar 31 having an arm 33 secured to one of its ends and adapted to be bent to engage the other end of bar 31 as best shown in FIG. 1, thus locking the clip to prevent accidental removal of the clip 30.

As is readily apparent, portable tongue 10 can be easily and readily separated from frame 50 of a trailer by removing each locking clip 30, thus allowing each round bar 47 of male coupling members 26 to be lowered and separated from the round openings 44 in projections 40 of female coupling members 28. This separation of tongue 10 from the frame 50 obviates the safety hazard discussed herein and allows a person to either store the tongue 10 or use tongue 10 over and over for attachment to trailers for towing purposes.

Figure 3:
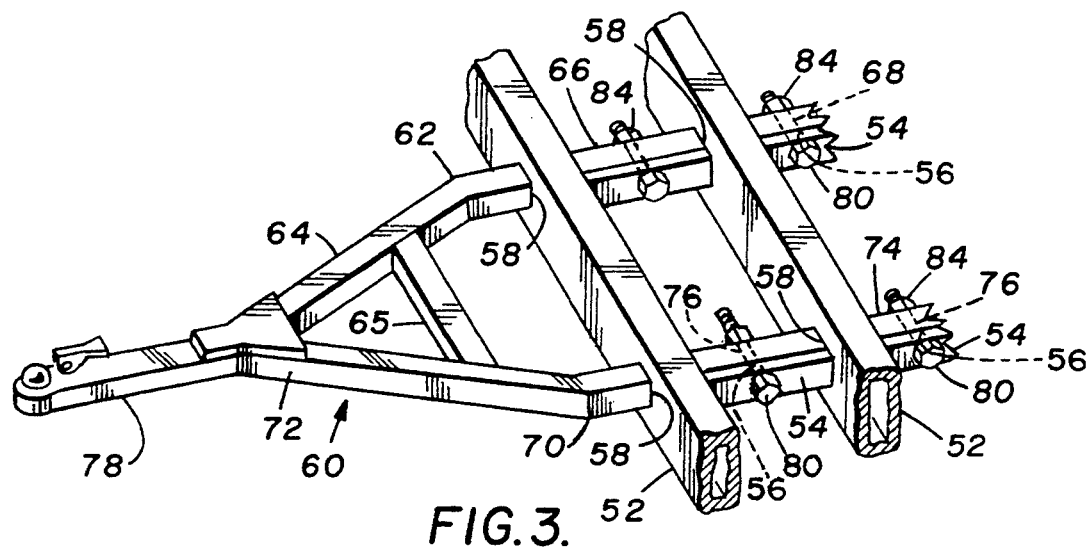
FIG. 3 is a partially broken away, exploded view of a second embodiment of the portable tongue of the present invention removably secured to a frame, such as may be used for a house trailer.

FIG. 3 illustrates, by way of example, a second embodiment of the portable (removable) tongue 60 removably secured to the two most forward cross members 52 and 53 of frame 50 which supports a house trailer or the like (not shown). As shown, frame 50 also includes beams 54 which are secured perpendicular to adjacent cross members 52 and 53 by any suitable means such as welds (not shown) with each beam 54 including an opening 56 for purposes to be explained later. Cross members 52 and 53 have the ends of beams 54 in abutting secured relation with cross member 53 being rearward of and in spaced relation with cross member 52. Further, as shown, each of the two most forward cross members 52 and 53 has a pair of openings 58 therethrough through which second sections 66 and 74 pass for purposes to be later explained. FIG. 3 illustrates, by way of example, the portable (removable) tongue 60 as comprising a first arm 62, a second arm 70, and a conventional coupler and hitch lock 78. For simplicity, the conventional jack 32, as shown in FIG. 1, is not shown in FIG. 3, however, it is to be understood that a conventional jack could be fixed by any suitable means such as welds to the first arm 62 and the second arm 70 at a location immediately behind the conventional coupler and hitch lock 78 in the general manner disclosed in the embodiment of FIG. 1. First arm 62 includes a first section 64 and a second section 66, with first section 64 being at an angle to its second section 66. Second arm 70 includes a first section 72 and a second section 74, with first section 72 being at an angle to its second section 74. Second section 66 of first arm 62 includes a pair of horizontal holes 68 therein. Second section 74 of second arm 70 includes a second pair of horizontal holes 76 therein. The first section 64 of first arm 62 and the first section 72 of second arm 70 diverge and meet at a point where their free forward ends are permanently secured by conventional means such as welds to conventional coupler and hitch lock 78. A rod 65 is secured to and connects first arm 62 and second arm 70 for bracing and strengthening tongue 60. When the parts of tongue 60 are assembled and permanently secured, the second section 66 of first arm 62 is parallel to the second section 74 of second arm 70. When it becomes necessary to move a house trailer secured to the frame 50 as depicted in FIG. 3, a user would merely insert the free ends of the second sections 66 and 74 of arms 62 and 70 through openings 58 in the two most forward cross members 52 and 53 of frame 50 to a position where the horizontal holes 68 of first arm 62 and the horizontal holes 76 of second arm 70 are behind the respective one of the most forward cross members 52 and 53 of frame 50 in alignment with the holes 56 in beams 54 and then insert a bolt 80 through each hole 56 and 76 and applying a lock washer (not shown) and nut 84 to each bolt 80.

As is readily apparent, portable tongue 60 can be easily and readily separated from the cross members 52 of the frame by removing each bolt 80, the lock washer and nut 84, thus allowing the free ends of the second sections 66 and 74 of arms 62 and 70 of tongue 60 to be removed from the openings 58 in cross members 52. The separation of tongue 60 from the cross members 52 of the frame obviates the safety hazard discussed herein and allows a person to either store the tongue 60 or use the tongue 60 over and over for towing purposes.

Although we have shown specific construction and arrangement of the parts and features constituting preferred embodiments of our invention, changes may be made in the parts and features without affecting the operativeness of the invention. For example, it is readily apparent that the shapes of many parts or features may be square, round or otherwise than the shapes specifically set forth herein. It will therefore be obvious to those skilled in the art that various modifications may be made without departing from the spirit of the invention. Having fully described the invention and the presently preferred embodiments thereof.

We claim:

1. A detachable hitch apparatus adapted for connection to an elongated frame having a plurality of longitudinal, load bearing, main members extending substantially the length of the frame in a common plane and at least one cross member arranged transverse to the longitudinal, load bearing, main members, said at least one cross member including a pair of spaced openings therein; said detachable hitch apparatus comprising vehicular securing means for releasably securing said hitch apparatus to a vehicle, a pair of arms extending in a direction opposed to said vehicular securing means, each of said arms having a first end and a second end, said first end of each said arm being secured to said vehicular securing means, and releasable attachment means associated with each said second end of said arms for releasably securing said pair of arms to the said at least one cross member, said releasable attachment means comprises a pair of female coupling members, each including a base plate adapted to be secured to a back side of the said at least one cross member, a projection fixed to said base plate adapted to pass through said spaced openings in the said at least one cross member, a vertically disposed opening in each of said projections, and a plate secured to each said second end of said arms and a male coupling member secured to each of said plates, each of said male coupling members including an enlarged base and a bar extending upwardly from said enlarged base and having a transverse bore therein.

2. The detachable hitch apparatus of claim 1 wherein said releasable attachment further comprises means for passing through said transverse bores in said bars for locking said male coupling member to said female coupling member.

3. A detachable hitch apparatus adapted for connection to an elongated frame having a plurality of longitudinal, load bearing, main members extending substantially the length of the frame in a common plane and a plurality of vertically disposed cross members arranged transverse to the longitudinal, load bearing, main members, the most forward of said vertically disposed cross members including a pair of spaced openings therein; said detachable hitch comprising a tongue including a coupler and hitch lock mounted on a forward end thereof, a crank jack secured thereto adjacent said coupler and hitch lock, a pair of diverging arms extending in a direction opposed to said coupler and hitch lock, each of said arms having a first end and a second end, said first end of each said arm being secured to said coupler and hitch lock, and means associated with each said second end of said arms for releasably securing said tongue to the elongated frame, said means for releasably securing said tongue to the elongated frame comprises a pair of female coupling members, each including a base plate adapted to be secured to a back side of the most forward of said vertically disposed cross members, a projection fixed to said base plate adapted to pass through said spaced openings in the most forward of said vertically disposed cross members, and a vertically disposed opening in each of said projections, said means for releasably securing said tongue to the elongated frame further comprises a plate secured to each said second end of each said arm and a male coupling member secured to each of said plates, each of said male coupling members including an enlarged base and a bar extending upwardly from said enlarged base and having a transverse bore therein.

4. The detachable hitch apparatus of claim 3 wherein said means for releasably securing said tongue to the elongated frame further comprises means for passing through said transverse bores in said bars for locking said male coupling member to said female coupling member.

* * * * *